(12) United States Patent
Kollaritsch

(10) Patent No.: US 10,540,470 B1
(45) Date of Patent: Jan. 21, 2020

(54) GENERATING A POWER GRID FOR AN INTEGRATED CIRCUIT

(71) Applicant: Cadence Design Systems, Inc., San Jose, CA (US)

(72) Inventor: Paul W. Kollaritsch, Solana Beach, CA (US)

(73) Assignee: CADENCE DESIGN SYSTEMS, INC., San Jose, CA (US)

( * ) Notice: Subject to any disclaimer, the term of this patent is extended or adjusted under 35 U.S.C. 154(b) by 261 days.

(21) Appl. No.: 15/585,623

(22) Filed: May 3, 2017

(51) Int. Cl.
    *G06F 17/50* (2006.01)

(52) U.S. Cl.
    CPC ...... *G06F 17/5072* (2013.01); *G06F 2217/78* (2013.01)

(58) Field of Classification Search
    CPC .......... G06F 1/1632; G06F 1/26; G06F 13/24; G06F 1/3203; G06F 13/28; G06F 17/5036; G06F 1/10; G06F 1/263; G06F 1/32; G06F 1/3215; G06F 1/325; G06F 17/5068; G06F 1/04; G06F 1/08; G06F 1/1616; G06F 9/30083; G06F 11/3423; G06F 13/124; G06F 13/4068; G06F 15/78; G06F 17/5045; G06F 17/5072; G06F 17/5077; G06F 1/3228; G06F 1/3237; G06F 1/324; G06F 1/3265; G06F 2213/0038; G06F 2217/78; G06F 9/30079; G01S 17/89; H04N 21/44008; H04N 21/4318; Y02D 10/128; Y02D 10/153; Y10T 307/406

USPC .................................................. 716/118–126
See application file for complete search history.

(56) References Cited

U.S. PATENT DOCUMENTS

| | | | |
|---|---|---|---|
| 8,245,172 B2 | 8/2012 | Hsu | |
| 8,595,681 B1 | 11/2013 | Thirunavukarasu et al. | |
| 8,707,228 B1 | 4/2014 | Kollaritsch et al. | |
| 8,719,743 B1 | 5/2014 | Kollaritsch et al. | |
| 8,812,286 B1 | 8/2014 | Lin et al. | |
| 2007/0094630 A1* | 4/2007 | Bhooshan | G06F 17/5077 716/112 |
| 2007/0157144 A1* | 7/2007 | Mai | H01L 27/11807 327/334 |
| 2015/0339419 A1* | 11/2015 | Korobkov | G06F 17/5036 703/2 |

* cited by examiner

*Primary Examiner* — Binh C Tat
(74) *Attorney, Agent, or Firm* — Foley & Lardner LLP

(57) ABSTRACT

The present embodiments relate generally to creating power grids for complex integrated circuits having many power domains, macros, and secondary power regions. In some embodiments, a power grid compiler translates a high level description of a power grid into base-level commands that can be used by other tools to implement the wires and vias of the power grid. In these and other embodiments, the high level description comprises a terse, high-level, process technology dependent and design/chip independent language for describing the grid of power and ground wires and vias, including their connections to macros and a multitude of complex power nets that are typical in recent day SOCs. According to certain aspects, the language further allows designers to specify additions/subtractions to the core grid over macros and secondary power instance groups. According to still further aspects, embodiments allow for incremental repairs of only specific portions of the power grid.

18 Claims, 9 Drawing Sheets

```
subgrid -name SUBGRID5_PAMvar1
   layer -name M6var1   -subgrid   SUBGRID5_PAMvar1
      stripe -layer M6var1 -gnet PAMvar1 -pitch ...
      stripe -layer M6var1 -gnet GAC      -pitch ...

#End macro subgrid...    start core grid description:

layer -name M7
   stripe -name S7pam -layer M7 -gnet PSC -pitch ...
   stripeswap -stripe S7pam -gnet PAMvar1 \
      -over_subgrid SUBGRID5_PAMvar1
   stripe -name S7gac -layer M7 -gnet GAC -pitch ...
```

302

```
createRouteBlkg     Box1 -name tmpRtBlkg
createRouteBlkg     Box3 -name tmpRtBlkg
createRouteBlkg     Box4 -name tmpRtBlkg
setAddStripeMode    -bottom_via_layer M5
addStripe -layer M6 -net vddp  -pitch ...          -top_via_layer M6
addStripe -layer M6 -net vss   -pitch ...
deletRouteBlkg -name tmpRtBlkg
createRouteBlkg     Box1 -name tmpRtBlkg
createRouteBlkg     Box2 -name tmpRtBlkg
createRouteBlkg     Box3 -name tmpRtBlkg
setAddStripeMode    -bottom_via_layer M5
addStripe -layer M6 -net vddm  -pitch ...          -top_via_layer M6
addStripe -layer M6 -net vss   -pitch ...
deletRouteBlkg -name tmpRtBlkg
createRouteBlkg     Box2 -name tmpRtBlkg
createRouteBlkg     Box4 -name tmpRtBlkg
setAddStripeMode    -bottom_via_layer M6
addStripe -layer M7 -net vdds  -pitch ...          -top_via_layer M7
deletRouteBlkg -name tmpRtBlkg
createRouteBlkg     Box1 -name tmpRtBlkg
createRouteBlkg     Box3 -name tmpRtBlkg
createRouteBlkg     Box4 -name tmpRtBlkg
setAddStripeMode    -bottom_via_layer M6
addStripe -layer M7 -net vddp  -pitch ...          -top_via_layer M7
deletRouteBlkg -name tmpRtBlkg
createRouteBlkg     Box1 -name tmpRtBlkg
createRouteBlkg     Box2 -name tmpRtBlkg
createRouteBlkg     Box3 -name tmpRtBlkg
createRouteBlkg     Box4 -name tmpRtBlkg
setAddStripeMode    -bottom_via_layer M6
addStripe -layer M7 -net vddm  -pitch ...          -top_via_layer M7
deletRouteBlkg -name tmpRtBlkg
createRouteBlkg     Box2 -name tmpRtBlkg
createRouteBlkg     Box4 -name tmpRtBlkg
setAddStripeMode    -bottom_via_layer M6
addStripe -layer M7 -net vss   -pitch ...          -top_via_layer M7
deletRouteBlkg -name tmpRtBlkg
createRouteBlkg     Box1 -name tmpRtBlkg
createRouteBlkg     Box3 -name tmpRtBlkg
createRouteBlkg     Box4 -name tmpRtBlkg
setAddStripeMode    -bottom_via_layer M6
addStripe -layer M7 -net vss   -pitch ...          -top_via_layer M7
deletRouteBlkg -name tmpRtBlkg
createRouteBlkg     Box1 -name tmpRtBlkg
createRouteBlkg     Box2 -name tmpRtBlkg
createRouteBlkg     Box3 -name tmpRtBlkg
setAddStripeMode    -bottom_via_layer M6
addStripe -layer M7 -net vss   -pitch ...          -top_via_layer M7
deletRouteBlkg -name tmpRtBlkg
```

GENERATING A POWER GRID FOR AN INTEGRATED CIRCUIT

TECHNICAL FIELD

The present invention relates generally to integrated circuits, and more particularly to techniques for generating one or more power grids for various sub-chips or blocks of an integrated circuit.

BACKGROUND

Design engineers design integrated circuits (IC's, e.g. application specific integrated circuits (ASICs) or systems on chips (SOCs)) by transforming logical or circuit descriptions of the IC's into geometric descriptions, called layouts. IC layouts typically include (1) circuit modules (i.e., geometric representations of electronic or circuit IC components) with signal pins, and (2) interconnect lines (i.e., geometric representations of signal wiring) that connect the signal pins of the circuit modules.

Each IC also contains a power grid structure that provides power and ground to each electronic and circuit component of an IC. Each electronic or circuit IC component has a power pin(s) and a ground pin that is connected to the power grid structure. Power grid structure components include stripes, rails, and vias which must be of a certain strength (i.e., size) to meet design specifications (i.e., minimum specifications that the power grid structure must meet in order to be acceptable for use in the IC).

To create layouts and to physically implement these designs, design engineers typically use electronic design automation ("EDA") applications or tools. Such tools can include floorplanning tools that assign sub-chips or blocks of circuit modules in the design to target layers and regions of the IC. Typically, each sub-chip or block requires its own power domain and power grid. Usually, a designer needs to code the power grid for each sub-chip (block), which could number more than 100 blocks for a single IC, and so a designer would need to manually generate more than 100 separate and unique routines. If any changes are required to any portion of a power grid, these changes must also be done manually and for the entire grid. Existing software in the industry allows only uniform one-size-fits-all distribution of power grid, and lacks the capability to dynamically reconfigure the power grid with any desired changes. Accordingly, in view of these and other problems, improvements are needed.

SUMMARY

The present embodiments relate generally to creating power grids for complex integrated circuits having many power domains, macros, and secondary power regions. In some embodiments, a power grid compiler translates a high level description of a power grid into base-level commands that can be used by other tools to implement the wires and vias of the power grid. In these and other embodiments, the high level description comprises a terse, high-level, process technology dependent and design/chip independent language for describing the grid of power and ground wires and vias, including their connections to macros and a multitude of complex power nets that are typical in recent day SOCs. According to certain aspects, the language further allows designers to specify additions/subtractions to the core grid over macros and secondary power instance groups. According to still further aspects, embodiments allow for incremental repairs of only specific portions of the power grid.

BRIEF DESCRIPTION OF THE DRAWINGS

These and other aspects and features of the present embodiments will become apparent to those ordinarily skilled in the art upon review of the following description of specific embodiments in conjunction with the accompanying figures, wherein:

FIGS. 3A to 3E are diagrams illustrating example aspects of a high level description of a power grid according to embodiments, as well as how a power grid compiler according to the embodiments generates a power grid from the high level description;

DETAILED DESCRIPTION OF THE PREFERRED EMBODIMENTS

Figure 1:
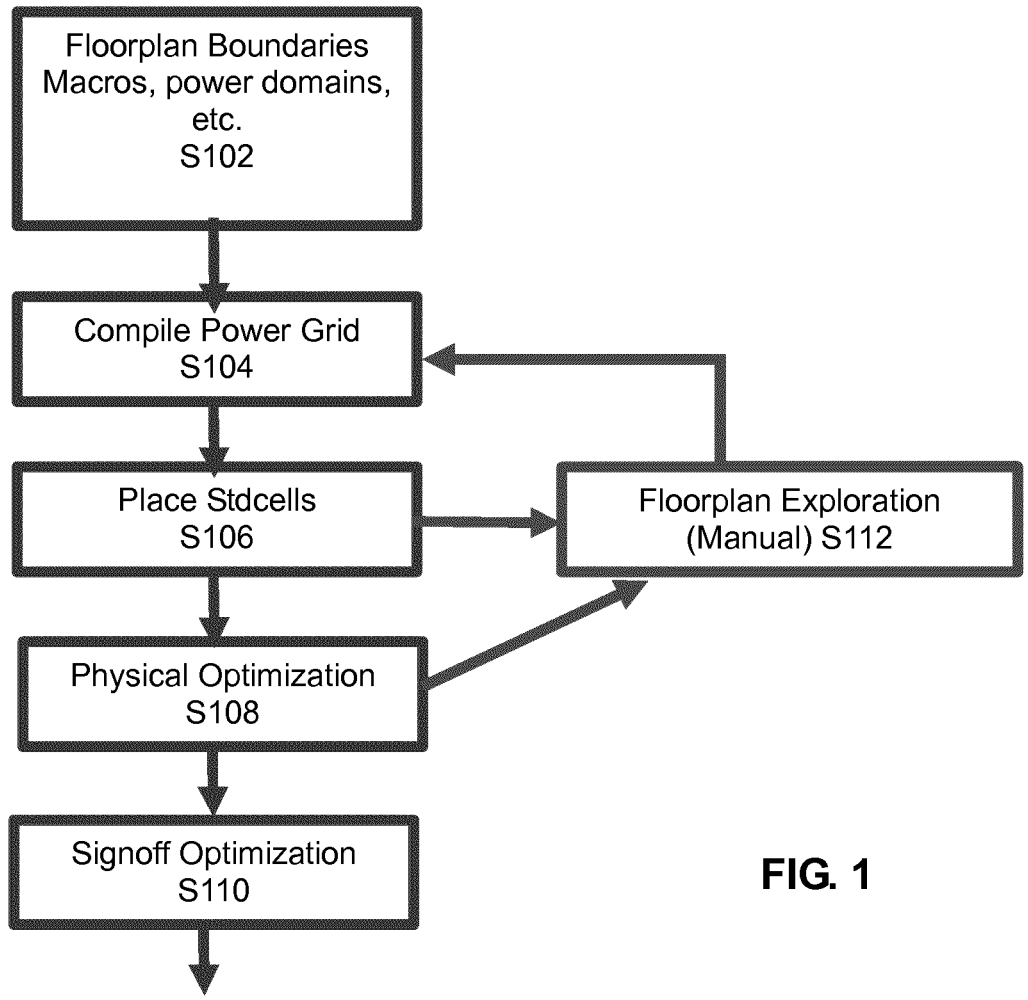
FIG. 1 is a diagram illustrating an example process flow in which the present embodiments can be included.

The present embodiments will now be described in detail with reference to the drawings, which are provided as illustrative examples of the embodiments so as to enable those skilled in the art to practice the embodiments and alternatives apparent to those skilled in the art. Notably, the figures and examples below are not meant to limit the scope of the present embodiments to a single embodiment, but other embodiments are possible by way of interchange of some or all of the described or illustrated elements. Moreover, where certain elements of the present embodiments can be partially or fully implemented using known components, only those portions of such known components that are necessary for an understanding of the present embodiments will be described, and detailed descriptions of other portions of such known components will be omitted so as not to obscure the present embodiments. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the present disclosure is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present embodiments encompass present and future known equivalents to the known components referred to herein by way of illustration.

According to certain aspects, the present applicants recognize that conventional methods for creating and implementing power grids in ICs such as ASICs and SOCs are labor-intensive and unsatisfactory. For example, a designer typically needs to manually code a routine containing a multitude of low level, Power Grid Assembly Language-like (PGAL) commands for each sub-chip (block), which can number more than 100 blocks for a single IC, and so would need more than 100 separate and unique routines. These PGAL commands are then executed by existing IC EDA tools to produce the wires and vias which make up the power grid.

Not only is this very labor intensive and error-prone, if only a certain region of a sub-chip's power grid needs to be changed or optimized (e.g. for better QOR), then there are generally only two choices. First, the sub-chip's PGAL routine must be enhanced with a new grid specification for each region to change and then the resulting PGAL routine would need to be re-run to regenerate the grid for the sub-chip. This is very time-consuming (i.e. 100 sub-chip scripts times 10 regions per sub-chip =1000 power grid script enhancements). Alternatively, wires/vias would need to be manually added to/removed from the original grid. This manual approach makes it impractical for design companies to incorporate power grid changes when there are tight tape-out delivery schedules. In these cases, most of the designs are taped-out leaving significant power optimizations on the table.

Accordingly, the present embodiments relate generally to more efficiently creating power grids for complex integrated circuits having many power domains, macros, and secondary power regions. In some embodiments, a power grid compiler translates a high level description of a power grid into base-level commands that can be used by other tools to implement the wires and vias of the power grid.

FIG. 1 is a diagram illustrating an example integrated circuit design process flow in which power grids can be generated using techniques according to the present embodiments. It should be preliminarily noted, however, that the embodiments are not limited to being practiced in flows having all of these steps, or in the order shown.

As shown, an example process flow includes a step S102 in which an initial floorplanning for an integrated circuit design is performed. This includes identifying locations and boundaries for all the sub-chips or blocks of the integrated circuit design, all the macrocells (i.e. macros) within the blocks, and the power requirements for the blocks. This can be done with standard floorplanning tools known to those skilled in the art.

In a next step S104, the power grid for each of the blocks is compiled. As will be described in more detail below, this includes providing a single high-level description of the power grid and automatically generating the power grids from this high-level description. In the examples described in more detail below, this includes converting the high-level description to PGAL commands, which are then used to create the actual wires and vias of the power grids.

In step S106, the standard cells of the integrated circuit design are placed in accordance with the floorplan locations and boundaries defined in step S102, for example using placement tools known to those skilled in the art. Then in step S108, a physical optimization is performed to refine the placement of standard cells in step S106. This can be done using conventional optimization tools which route wires connecting the stdcells, and then make small changes in cell sizes, placements, and routings in accordance with physical design factors such as, for example, timing (performance of the block), area consumption of the standard cells, power consumption of the standard cells, electromigration, die yield, etc. When these steps S106 and S108 have been completed, a final signoff optimization is performed in step S110. This step can be performed using conventional optimization tools, and can include resistance and capacitance extraction, static timing analysis, IR (voltage) drop analysis, geometric design rule checks, yield analysis, etc to guide incremental adjustments to cell size, placement, and routing connections.

As shown in the example flow of FIG. 1, after performing either or both of the placement in step S106 or the optimization in step S108, floorplan exploration can be performed in step S112. This generally involves the designer manually reviewing the results of placement and/or optimization in steps S106 and S108, and further manually adjusting the boundaries and locations of floorplan, macrocells and/or power domains initially defined in step S102, after which the subsequent steps are performed again. However, as will be further described below and in accordance with aspects of the present embodiments, this subsequent processing can include performing incremental power grid repair in step S104.

Example aspects of processing performed in connection with compiling power grids according to the present embodiments, such as that performed in step S104 in the example flow described above, will now be described in more detail.

Figure 2A:
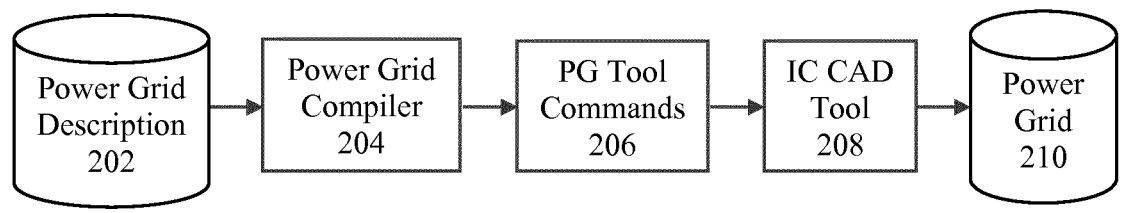
FIG. 2A is a diagram illustrating an example process of compiling a power grid from a high level description of a power grid according to the embodiments.

In embodiments, generating power grids includes receiving a high level description of the power grid for a given process technology, usually from the library/technology group. An example overall methodology according to the embodiments is shown in FIG. 2A. As shown in this example, a high level power grid description 202 for a sub-chip or block is used by a power grid compiler 204 to generate a power grid tool commands 206 for the sub-chip or block.

In embodiments such as that shown in FIG. 2A, the generated power grid tool commands 206 comprise low level commands or scripts (e.g. power grid assembly language-like commands or PGAL) that are used by other EDA tools (e.g. a power grid router) 208 to generate the actual shapes and power/ground nets for the integrated circuit design. These commands include commands such as createRouteBlockage, addStripe, editPowerVia, etc. that are provided by existing tools to implement the actual wires and vias of the power grid 210.

Figure 2B:
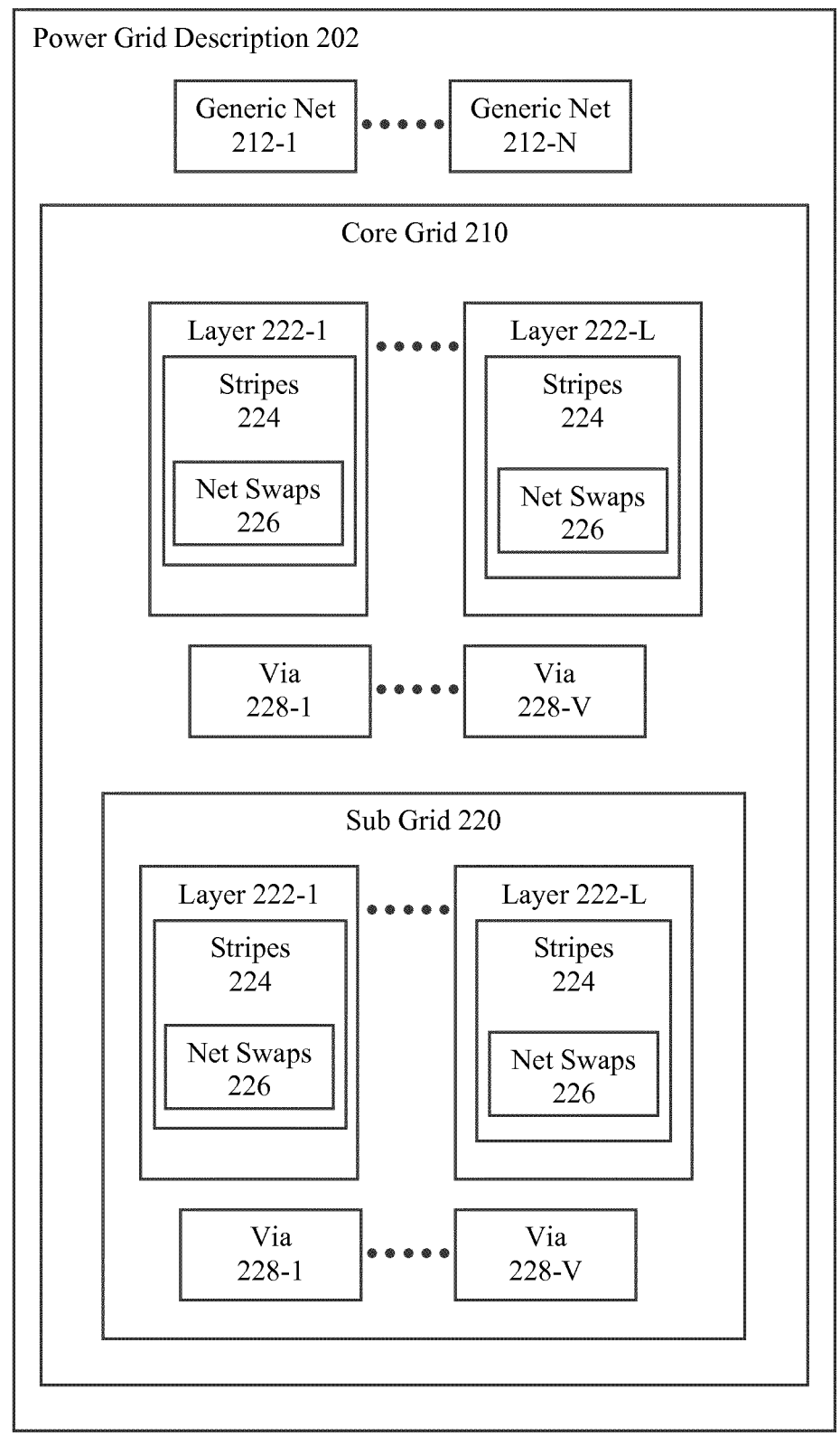
FIG. 2B is a diagram illustrating an example of a high level description of a power grid according to the embodiments.

An example of a high-level power grid description is shown in FIG. 2B. As shown, the description 202 of power grid object points to a core grid object 210 and can include generic nets 212-1 to 212-N. Each core grid object 210 can include one or more sub-grid objects 220.

Embodiments allow for the description of generic nets 212 to also include "generic net names", such as PSC (power for stdcell), GAC (ground), PAC (power always-on), PAM1 (power for memory), PAM2 (different power for memory) etc. In these and other embodiments, these generic nets are mapped to the power nets of the specific sub-chip during its power grid generation (e.g. PSC is mapped to power net 'vdd', PAC is mapped to 'vdd_aon', GAC is mapped to ground net 'vss', etc.). This allows for the power grid description 202 to be high-level, meaning it is design/block independent. In other words, the description of 202 is not hard-coded with a block's power net names as in the PGAL.

Embodiments also allow for generic net name OR'ing. For example, PAC|PSC means "PAC or PSC" the first one which maps to a real net, and so for a non-switchable power domain where PAC is mapped to 'UNUSED' (which means maps to no net) and PSC is mapped to 'vdd', so PAC|PSC maps to the actual net for PSC, 'vdd'. For a switchable power domain, both PAC and PSC are mapped to actual nets, so PAC|PSC will get mapped to the actual net name represented by PAC.

As shown in the example of FIG. 2B, core grid 210 and each sub-grid 220 can include instances of layer objects 222-1 to 222-L and via objects 228-1 to 228-V.

The description of each layer 222 can include a LEF metal name, a width, a pitch, an offset origin, and multiple stripe objects 224. Each stripe object 224 for a layer can be specified as corresponding to one of the generic nets 212 in the core grid 210, and can further include a width, an offset, an offset origin, a pitch specification that specifies a spacing between stripes—generally all the information needed to generate grid wire(s). If a layer and a stripe has the same attribute (i.e. width) with a different value, then the stripe's value will override the layers value. For example, usually, the layer contains the width setting and occasional one of its stripes will have a width value overriding the layer's value.

As shown in this example, a stripe object 224 can contain zero or more "generic net swap" objects 226. For example, a core grid layer's stripe object 224 could be specified for the "generic net name" PSC, but can also contain a "generic net swap" object, in which case over the sub-grid 220 it can specify the generic net to be used to be PAC instead. Stripe object 224 could contain multiple "generic net swap" objects, for example two "generic net swap" objects, one to swap to generic net PAC over sub-grid A, and one to swap to generic net PAM1 over sub-grid B.

A layer 222 can be marked as a "via guide", so that the power grid compiler produces PGAL commands to create (temporary) stripes which will also create vias, and then produces PGAL commands to delete these temporary stripes (leaving the vias). This concept allows via stacks to be "guided" to controlled, specific location. Regular vias (e.g. for a stripe which orthogonally intersects stripes and macro cell pins) can be specified as a predefined LEF via, predefined LEF viaRule, or as "generate". Also, non-orthogonal vias can be specified (i.e. vias between co-aligned wires of different layers).

Sub-grids 220 can be 1) over specified memory/partition macro, 2) over specified regions of the core grid 210, or 3) specified for secondary power. So, correspondingly, sub-grids are marked one of three types: 1) macro, 2) region, 3) secondary power. For example, a sub-grid 220 can be specified over macros by matching the pins/nets/layers of the macro. For example, if a memory macro contains pins of layer M7 connecting to PAM1 and GAC, it will only be matched up if a sub-grid exists which is of type "macro", and contains layer M7 with two stripes, one stripe with generic net PAM1 and one stripe with generic net GAC. Note that these M7 stripes will have width=0 (and no pitch nor offset defined) so that no new M7 stripes are created which would conflict with the already existing M7 pins. These zero-width stripes are only used to uniquely identify a macro to a macro sub-grid. Furthermore, this sub-grid could either 1) have a higher metal layer(s) (i.e. M8) with PAM1 and GAC stripes to connect the M7 macro pins or 2) no additional metal layers, relying on, for example, M10 core stripes to connect the M7 macro pins.

Further, a sub-grid 220 can be specified over specified regions by marking it as type 'region' and providing a prefix of, for example, a placement density blockage (typically of very low percentage so as not to influence the place and route results) used to specify its boundaries. For example, if the exists a placement density screen named "region_sub_grid_for_extra_M9_PSC_1", and a sub-grid of type 'region' containing density_screen_name_prefix= "region_sub_grid_for_extra_M9_PSC_", that sub-grid will match that density screen and be used to specify extra layer M9 stripes in that region.

In addition, sub-grid 220 can be specified for secondary power by marking it type="secondary power" and, for example, setting its inst_group_name_prefix="2nd_pg_", and adding a M9 layer with stripes of generic net names "PSC", and "PAC". During initial floorplanning step S102, the, designer could create an instance group, naming it "2nd_pg_B", assigning to it instances requiring secondary power (such as level shifters, AO buffers, etc.), and create a region (which has a rectilinear boundary) for the instance group. The power grid compiler 204 will match that secondary power sub-grid with that instGroup (since the prefix matches), and the primary and secondary powers of the instances in that inst group match generic net names "PSC" and "PAC". Then the extra stripes specified in that secondary power sub-power grid will be generated in that region creating wires to that secondary power required by those instances so they can be connected.

Figure 3B:
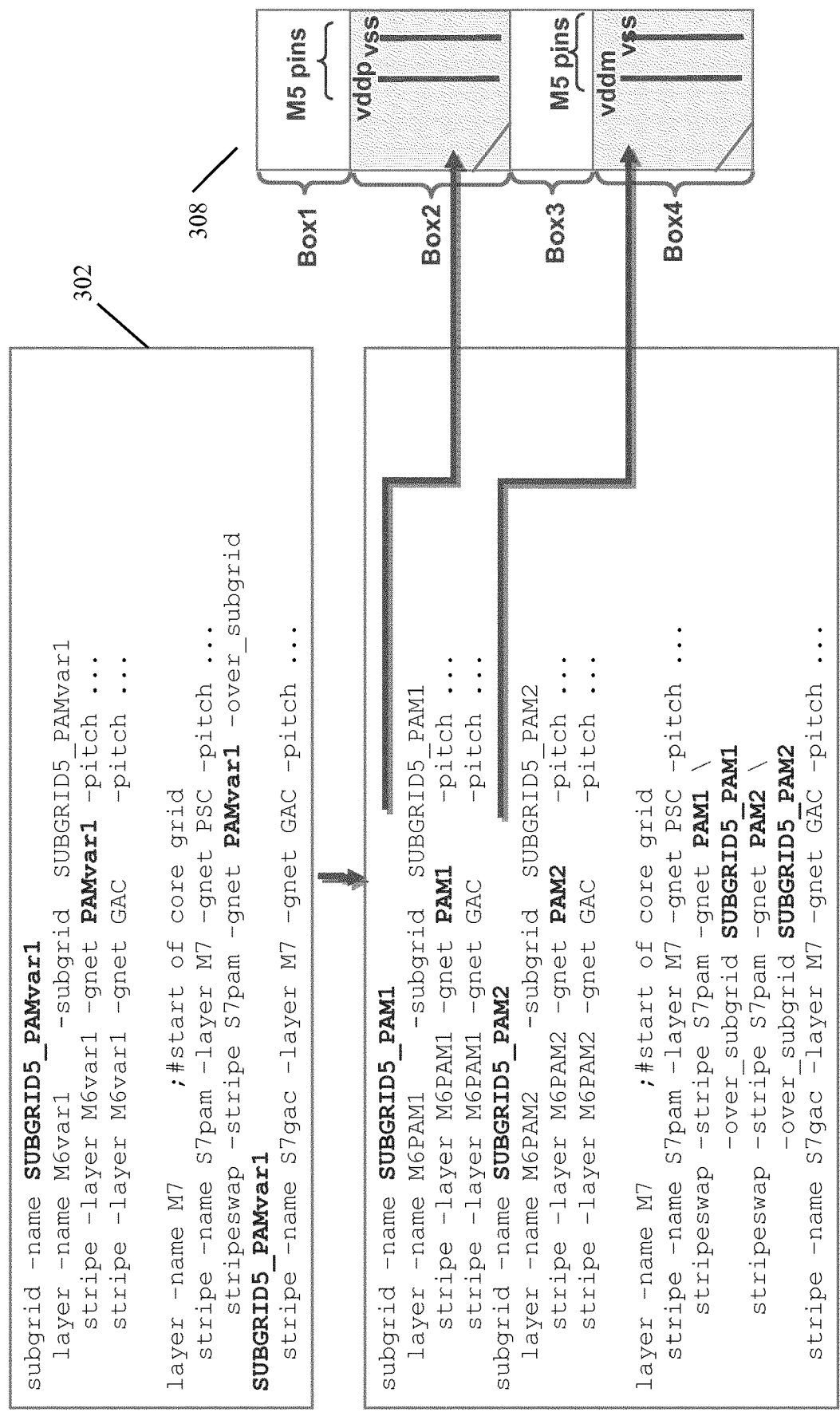
Figure 3C:
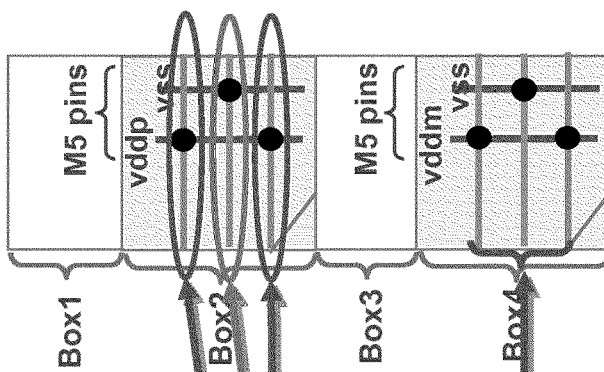
Figure 3D:
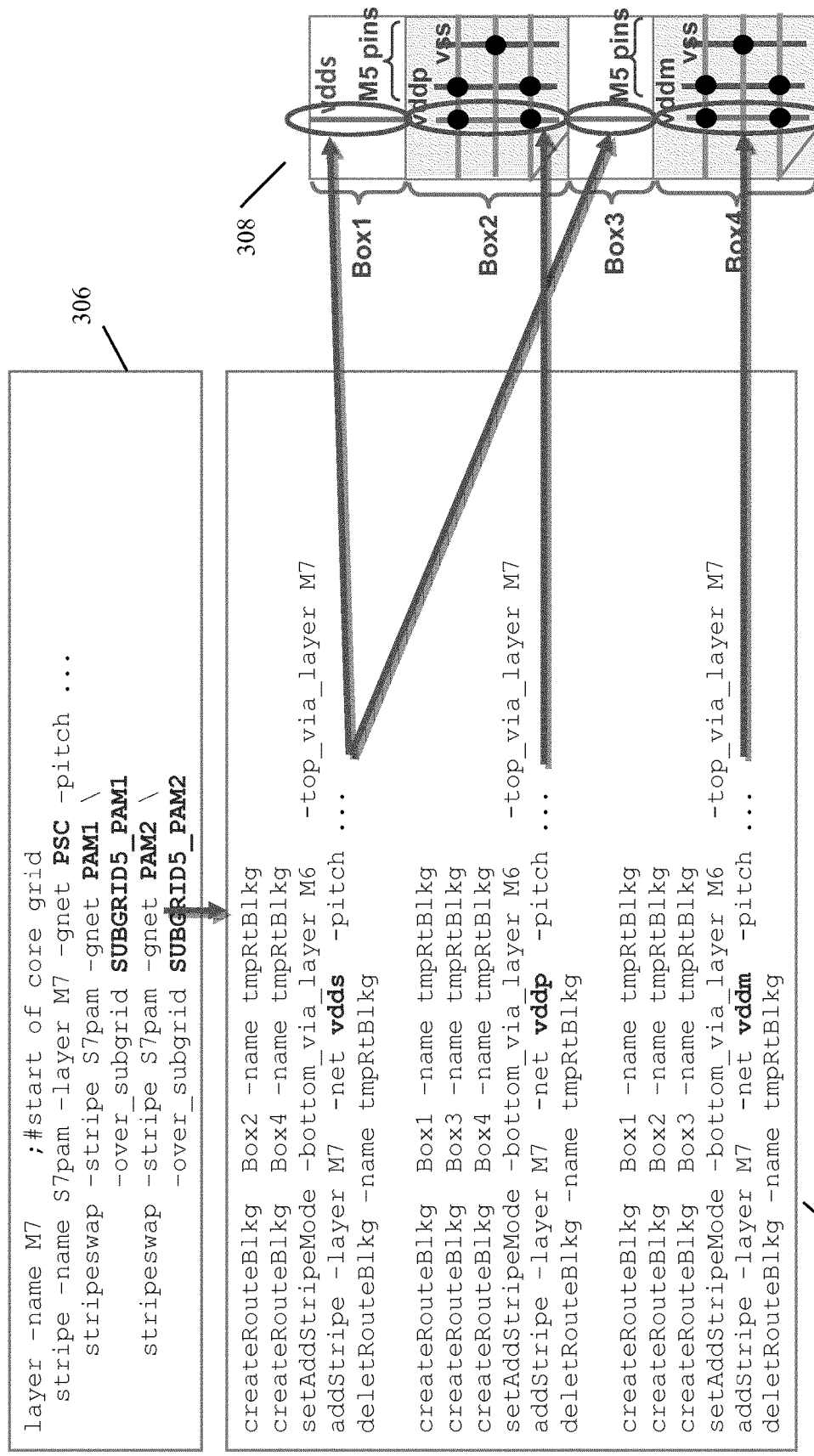

The sub-grid 220 ties into and can modify the core grid 210 stripes, or add extra stripes over the region specified by the sub-grid (see FIG. 3D). Secondary power sub-grids 220 are matched to instance group regions by prefix name specified in the sub-grid object. Macro sub-grids 220 are matched to macros which contain the same nets of the same top pin layer specified by the sub-grid. Any power net connecting to a macro which has not already been mapped to PSC, PAC, GAC, will get mapped to PAM (Power over memory), PAM2, PAM3. . . . Since there can be over 100 PAMs in one sub-chip/block, this can lead to millions of sub-grid definitions (i.e. SubGrid_PAM_PAM2_PAM3, SubGrid_PAM8_PAM43_PAM78, etc.). However, less than 100 will actually be used in a block.

Embodiments of sub-grid description 220 can include a "template sub-grid" which can minimize the number of combinations of sub-grids to specify and thus drastically reduce the number of lines required in the overall description 202. And since this is a high level description, it can be made design independent so that only one sub-grid template needs to be specified to handle all the 100+sub-chips/blocks of a design/IC (including the top/chip level) and the hundreds of blocks of completely unrelated designs/ICs of the same process technology.

For example, description 220 can include a single template sub-grid SubGrid_PAMvar1_PAMvar2_PAMvar3, and then the actual sub-grids used by a block (SubGrid_PAM27_PAM32_PAM55, SubGrid_PAM8_PAM43_PAM78, etc.) will be generated on the fly during the power grid compilation for that block.

Compiler 204 converts the high-level design-independent description 202 into the design specific, base-level commands 206 which are used by existing IC CAD Tools 208 to generate the power grid according to specifications for only this design. There are typically two or three power grids 202 defined for a process technology. Each power domain within a block will have rectilinear boundaries defining its extents and a power grid associated with that power domain. For each power domain, compiler 204 generates the PG Tools Commands 206 to implement the sub-grids for macros, secondary power grids for instance groups, and sub-grids for regions and then the compiler 204 generates the PG Tool Commands 206 to implement the core grid which also goes over the sub-grid to ensure all sub-grids are connected, attaching these sub-grids to the core grid.

Compiler 204 maps the generic net 212 names to actual power net names in the current block, by examining all the instances of macros, and making a list of all the actual power nets which connect to those macros. Power nets which have already been mapped earlier (i.e. PAC=vdd, PSC=vddswitching, PSC=vddaon, PSC2=vddaon2, etc.) will be removed from the list, and the remaining nets on the list will be mapped to PAM1 thru PAMN, where N is the number of power nets remaining on the list. Compiler 204 also clones template sub-grids 220 (containing variable generic net names), to sub-grids 220 with used generic net names which have mappings to actual net names. For example, assume a template sub-grid 220 included in a description 202 is named with a variable generic net name SubGrid_PAMvar1_PAMvar2_PAMvar3, and that the block netlist has power nets which power grid compiler 204 maps to (during power grid compilation) the generic nets 212 named PAM27, PAM32 and PAM55 connecting to a first macro, and generic nets 212 PAM8, PAM43 and PAM78 connecting to a second macro. Compiler 204 clones this template sub-grid object, SubGrid-PAMvar1_PAMvar2_PAMvar3, to a first sub-grid associated with the first macro, renames this first copy to SubGrid_PAM27_PAM32_PAM55, and substitutes variable generic net name PAMvar1 with PAM27, PAMvar2 with PAM32, PAMvar3 with PAM55 at all places in the first sub-grid description 220. Compiler 204 also clones this template sub-grid object, SubGrid_PAMvar1_PAMvar2_PAMvar3, to a second sub-grid associated with the first macro, renames this second copy to SubGrid_PAM8_PAM43_PAM78, and substitutes variable generic net name PAMvar1 with PAM8, PAMvar2 with PAM43, and PAMvar3 with PAM78 at all places in the second sub-grid description 220. So, the cloning creates new, non-template sub-grids.

It should be noted that the high level description according to embodiments, using variable names and the like as described above, allows for a single high level description to be used in many different IC designs having the different sub-chips or blocks and different power net names and using the same process technology. For example, the generic net names used in the single high level PG description can be mapped to the specific, yet different net names of each chip and its sub-blocks.

Example aspects of a description 202 and power grid compiler 204 according to some example embodiments will now be described in connection with FIGS. 3A to 3E.

As shown in FIG. 3A, a portion of a high level, chip and sub-chip independent grid description 302 is compiled into low level, chip/sub-chip specific, PGAL commands 304. As can be seen, according to aspects of the embodiments, the description 302 is substantially more terse and compact than the PGAL commands used to implement grid 304. It should be noted, however, that the present embodiments are not limited to the specific examples of description 302 that are shown in these FIGS. 3A to 3E, and that many variations are possible.

FIG. 3B illustrates an example of how compiler 204 duplicates a sub-grid template in 302 into actual sub-grid descriptions to remove the variables. More particularly, the sub-grid template in description 302 with the variable generic net name "SUBGRID5_PAMvar1" is duplicated twice to create a new description 306 which includes sub-grids with actual generic net names PAM1 and PAM2. Similarly, the single stripeswap of the core grid M7 layer is cloned twice, one substituting variable generic net PAMvar1 to generic net PAM1, and the second cloned stripeswap substituting variable generic net PAMvar1 to generic net PAM2. This new description 306 is temporary and only generated on-the-fly during this specific sub-chip PG compilation and thus is forgotten at the end of the PG compilation.

FIG. 3B further illustrates an example of how description 306 is used by compiler 204 to generate assembly language like commands that can be used by other power grid tools to implement a power grid 308. As shown, in this example, the generic net name for GAC in description 306 has been mapped to the actual ground net for the design, which is vss, the generic net name for PAM1 has been mapped to the actual power net vddp, and the generic net name for PAM2 has been mapped to the actual power net vddm.

As further shown in the example of FIG. 3B, the design is divided into four separate areas called "boxes. Power grid 308 includes Box 1 and Box 3 which are only part of the core grid since they contain no macros (and their associated macro subgrids). Box 2 is considered part of the core grid as well as being a macro associated with subgrid SUBGRID5_PAM1 which contains pins to the first macro in layer M5, Box 2 containing the actual nets vddp (PAM1) and vss (GAC), Box 4 containing pins to the second macro associated with SUBGRID5_PAM2 in layer M5, and Box 4 containing the actual nets vddm (PAM2) and vss (GAC).

Figure 3E:
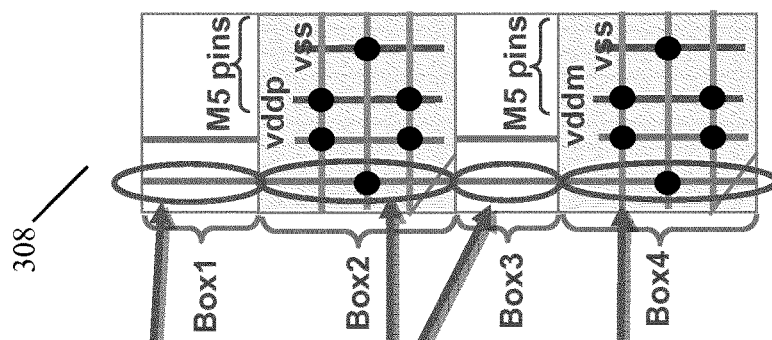

FIGS. 3C, 3D, 3E illustrate how the temporary, template-less high level power grid design language 306 is used by compiler 204 to generate PG Tools Commands (PGAL) 304 to implement a portion of grid that is used by other power grid tools 208 to generate stripes and vias for power grid 210. FIG. 3C illustrates an example of how temporary description 306 of the two subgrids corresponding to Box2 and Box4 is used by compiler 204 to generate PG Tools Commands (PGAL) to implement a portion of grid 304 that is used by other power grid tools to generate stripes and vias for power grid 308. More particularly, the stripe descriptions in 306 are mapped to the actual net names, stripes are created in the layers at a pitch specified by the descriptions in 306, and vias are created to connect the M6 stripes to the M5 nets/pins. As shown in the example, PGAL commands to add stripes for connecting to vddp and vss are created in metal layer M6 in Box 2, and vias are created at the intersections between these stripes and nets vddp and vss to connect between metal layers M5 and M6. Likewise, stripes for connecting to vddm and vss are created in metal layer M6 in Box 4, and vias are created at the intersections between these stripes and nets vddm and vss to connect between metal layers M5 and M6. Note that routing blockages are created over boxes 1,3, and 4 to confine the stripes to box 2 during creation of stripes in box 2.

FIG. 3D illustrates an example of a layer and its first stripe in the Core Grid 210 and how a core grid stripe over the sub-grids can be switched to different generic nets defined by a generic net swap (i.e. stripeswap) description in 306 which is used by compiler to implement a portion of grid 304 that is further used by other power grid tools to implement power grid 308. As shown in this example, the first paragraph of PG Tools Commands (PGAL) 304 creates the part of the core grid stripe in layer M7 which goes over the boxes, Box 1 and Box3, which do not contain a macro subgrid, and so boxes Box2 and Box 4 are blocked. Then commands to create the stripe are generated to connect with the generic net name PSC which maps to actual net vdds in this example.

As further shown in FIG. 3D, using the description in 306 for the stripe for connecting with PSC, commands are generated in the second and third paragraphs in 304 for adding stripes using the stripeswap descriptions in 306. The first stripeswap in 306, generates the second paragraph of 304 which contains routing blockages over boxes Box 1, Box 3, and Box 4 (so that the addStripe command will only generate a stripe over Box 2) since this first stripeswap. The second paragraph also contains the commands to generate a stripe using generic net PAM1 which is mapped to net vddp, instead of the default generic net PSC (which maps to actual net vdds). This command to generate the M7 stripe (over Box 2) will also create the vias to connect the vddp M6 stripes created earlier (see FIG. 3C). Similarly, the second stripeswap generates a generic net PAM2 (actual net vddm) layer M7 stripe over SUBGRID5_PAM2 (Box 4) and its associated vias to connect to the previously created M6 vddm wires, instead of connecting to the generic net PSC (actual net vdds) the default net of that core stripe in 306.

FIG. 3E illustrates an example of how description 306 is used by compiler to implement a portion of the core grid 304 that is used to generate an additional set of ground connections over macros in power grid 308. As shown in this example, description 306 specifies a stripe in layer M7 to connect with the generic net name GAC. As set forth above, the generic net name GAC has been mapped to the actual ground net vss. As further shown in FIG. 3E, using the description in 306 for the stripe for connecting with GAC, commands are generated in 304 for adding stripes for connecting with vss in layer M7, which are also shown in Box 1, Box 2, Box 3 and Box 4 in 308. Meanwhile, vias are created at the intersections between these new stripes in layer M7 and stripes in layer M6 connected with net vss in Box 2 for the macro associated with SUBGRID5_PAM1. Likewise, vias are created at the intersections between these new stripes in layer M7 and stripes in layer M6 connected with net vss in Box 4 for the macro associated with SUBGRID5_PAM2. This could be done with one addStripe command in 304 and without blocking any of the boxes if the vias specified in 306 are the same for the core and the subgrids, However, usually different vias are used and so separate addStripe commands are needed for each box.

In embodiments, power grid compiler 204 can perform incremental changes to a previously-generated power grid 206 by region, power domain, sub-grid, layer, and/or net name. For example, a sub-chip/block whose floorplan has changed (i.e. macros have been moved, design boundaries have moved, power requirements have increase/decreased, secondary power is now required, etc.) leaving the grid outside the changed area untouched, properly connecting the newly generated grid in the area, all without having to regenerate the entire grid, thus saving runtime.

Figure 4:
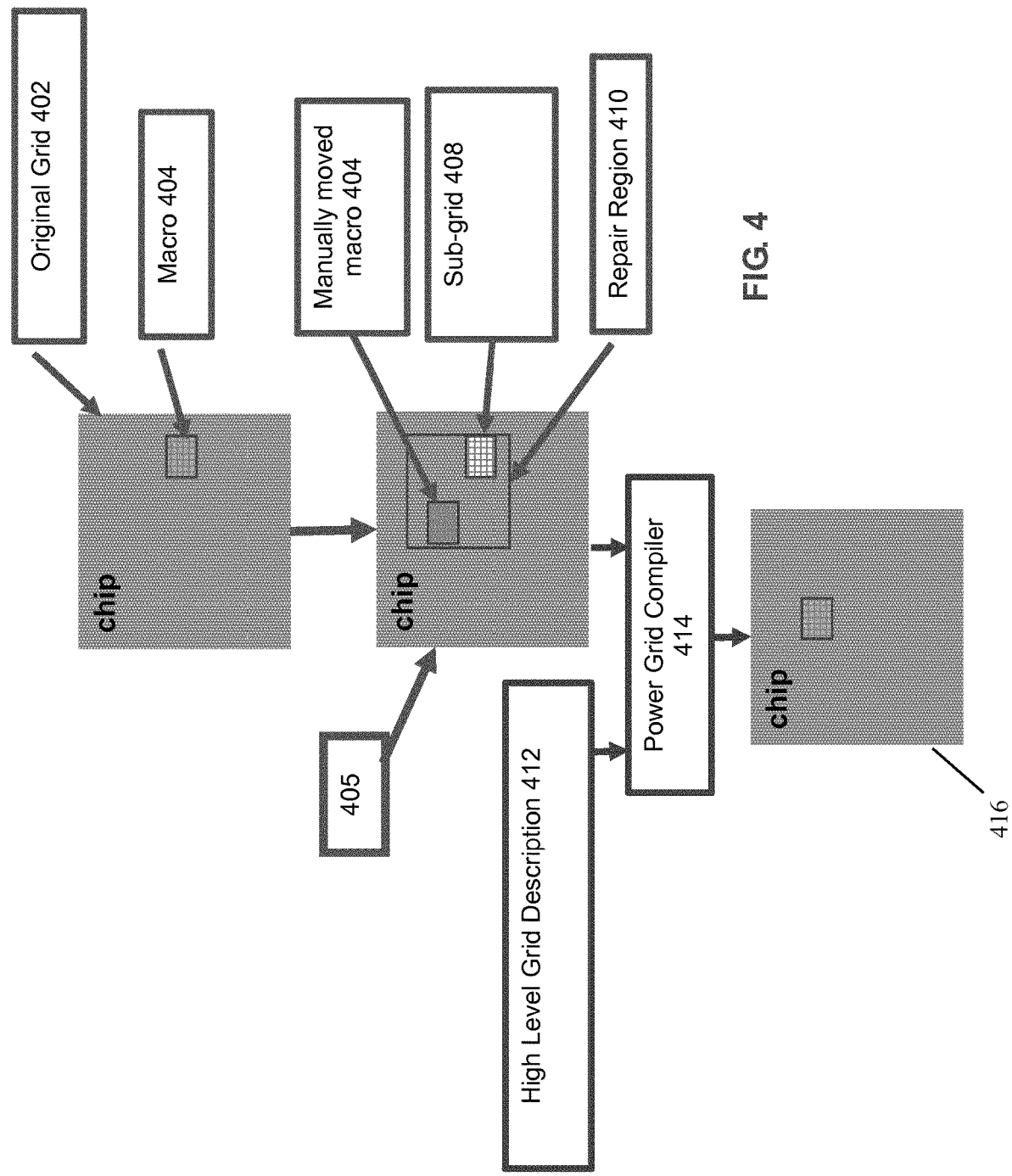
FIG. 4 is a diagram illustrating example aspects of how a power grid compiler according to embodiments can incrementally repair portions of a power grid.

FIG. 4 is a diagram illustrating these additional aspects of power grid compiler 204 according to embodiments. As shown in this example, a sub-chip/block has a power grid 402 that has been generated by a compiler 204 using a description 202 as set forth above. The sub-chip/block also has a macro with an associated sub-grid as specified in a description 202 as also set forth above. During a manual investigation of the original floorplan 402, a designer creates a new floorplan 405 where only a single macro 404 has been moved to a different location. As such the previously generated power grid 402 and the old sub-grid 408 associated with macro 404 are no longer valid, creating a region 410 in the power grid that requires repair.

However, because the embodiments include a high level description 412 of the power grid 402 and the sub-grid 408, the power grid compiler 414 can determine the boundaries of the region 410, as well as the new location for the sub-grid 408 from the floorplanning tool and generate a new power grid 416 which leaves the grid outside the changed area 410 untouched, while properly connecting the newly generated grid in the region 410. For example, a user can specify the area affected 410 and the high level descriptions of the power grid 412 The compiler 414 cuts and removes the existing grid (wires/vias) out of the area, repair region 410, and regenerates the commands using the new high level description 412 to incrementally recreate the grid. Note that it will generate different blockages from the original compilation since the macro has changed locations.

Those skilled in the art will understand how to implement a power grid compiler 204 according to embodiments based on the particular implementation of power grid 206 and the above descriptions.

Figure 5:
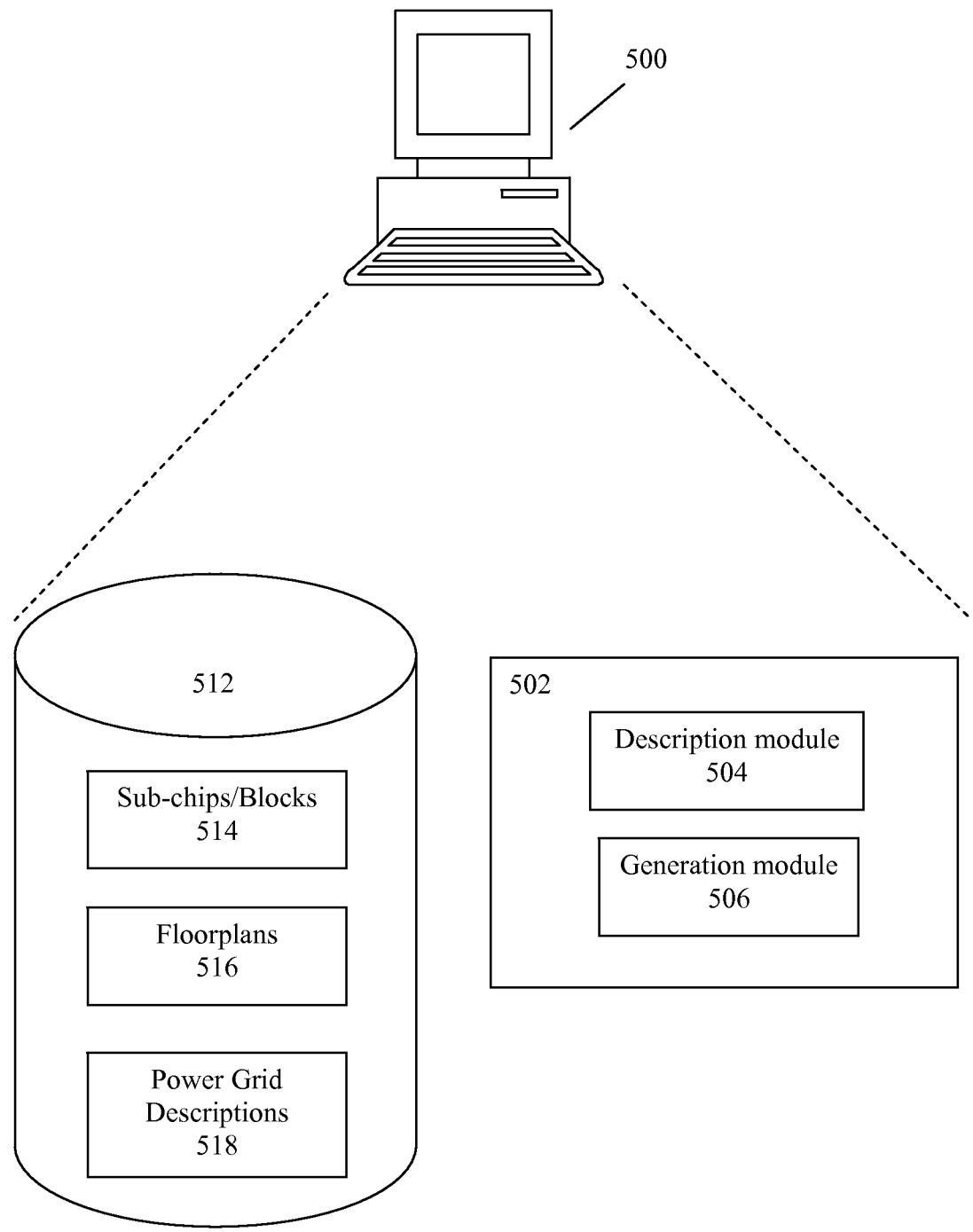
FIG. 5 is a diagram illustrating an example system according to embodiments.

FIG. 5 is a block diagram of an example system for generating power grids according to the present embodiments.

In embodiments, the system 500 can be one or more general purpose computers that are loaded with software (e.g., EDA tools) and/or customized to include hardware for interactively implementing physical electronic designs. In some embodiments, the one or more computing systems 500 comprise various components not shown such as processor(s) or processor core(s), memory, disks, etc. The software and/or custom hardware may include interactive or automated modules such as a placer, a routing engine, a layout editor, a design rule checker, a verification engine, a power integrity engine and/or a floorplanner, etc. as will be appreciated by those skilled in the art. The one or more computing systems 500 may further write to and read from a local or remote volatile or non-volatile computer accessible storage 512 that stores thereon data or information such as, but not limited to, one or more databases such as electronic circuit design database(s) including designs 514 for sub-chips and blocks of an integrated circuit, floorplans 516, and/or power grid descriptions 518 (e.g., a high level description having a format such as 202 shown in FIG. 2) that may be required to support the methodology of the present embodiments. In some embodiments, the one or more computing systems are implemented in a "cloud" configuration and/or a client/server configuration. For example, one or more server computers may be loaded with application software (e.g., an implementation system) for implementing some or all of the methodology of the present embodiments, and one or more client computers can communicate with the server computer(s) via a network to perform some or all of the methodology of the embodiments for a particular design.

In some embodiments, the one or more computing systems 500 may, by various standalone software, hardware modules or combinations thereof 502 (e.g., EDA tool), include a description module 504 to identify and create (e.g. providing a user interface allowing a designer to create files for various sub-chips/blocks) high level descriptions 202 of power grids for sub-chips/blocks 514 and a power grid generation module 506 (e.g. power grid compiler 204) for generating power grid tool commands in accordance with the present embodiments. The generated commands can be provided to another tool for generating the actual wires, vias etc. comprising the power grid. Additionally or alternatively, any or all of modules 504 and 506 may be implemented by adapting certain pre-existing modules (e.g., placer, floorplanner, implementation system, power grid router, etc.) with additional functionality as may be required to implement power grids and to physically implement electronic designs according to the present embodiments and as described above. Those skilled in the art will be able to understand how to implement various examples of such modules after being taught by the present disclosure.

Although the present embodiments have been particularly described with reference to preferred ones thereof, it should be readily apparent to those of ordinary skill in the art that changes and modifications in the form and details may be made without departing from the spirit and scope of the present disclosure. It is intended that the appended claims encompass such changes and modifications.

What is claimed is:

1. A method for implementing a power grid for a portion of an integrated circuit, the power grid comprising a plurality of wires and vias that electrically connect to power pins and ground pins of components in the integrated circuit, the method comprising:
receiving a high level description of the power grid, the high level description including a core grid and one or more sub grids that refer to the core grid;
automatically generating commands for creating hardware descriptions of the wires and vias of the power grid based on the received high level description; and
providing the automatically generated commands to a power grid router for creating shapes corresponding to the wires and vias of the power grid for use in physically implementing the integrated circuit,
wherein the automatically generated commands are provided in a language that can be executed by the power grid router and
wherein the high level description further includes a generic net name, and
wherein automatically generating includes mapping the generic net name to a specific power net for a sub-chip in the integrated circuit, and
wherein one or both of the core grid and the sub grid comprises a layer object having one or more stripe objects, and
wherein certain of the one or more stripe objects are specified as corresponding to the generic net name.

2. The method of claim 1, wherein the generic net name comprises a generic name of one of power for a standard cell, ground, power always-on and power for memory.

3. The method of claim 1, wherein one or both of the core grid and the sub grid comprises one or more layer objects.

4. The method of claim 3, wherein each of the one or more layer objects comprises one or more of a metal name, a width, a pitch, an offset origin, and a stripe object.

5. The method of claim 4, wherein the stripe object comprises one or more of a width, an offset, an offset origin, and a pitch specification.

6. The method of claim 3, wherein certain of the one or more layer objects is specified as a via guide, and wherein automatically generating includes generating first commands to create temporary stripes that also create vias, and second commands to delete the temporary stripes.

7. The method of claim 1, wherein the sub grid is specified for a particular macro in the integrated circuit.

8. The method of claim 1, wherein the sub grid is specified for a particular region in the integrated circuit.

9. The method of claim 1, wherein the sub grid is specified for a particular secondary power in the integrated circuit.

10. The method of claim 1, wherein the sub grid modifies stripes of the core grid in a region of the integrated circuit specified for the sub grid.

11. The method of claim 1, wherein the sub grid adds stripes to the core grid in a region of the integrated circuit specified for the sub grid.

12. The method of claim 1, wherein the sub grid comprises a template sub grid that is specified for a plurality of different sub-chips in the integrated circuit.

13. The method of claim 1, further comprising:
receiving an identification of a specific portion of the power grid; and
incrementally repairing the specific portion of the power grid without affecting other portions of the power grid.

14. A method for implementing a power grid for a portion of an integrated circuit, the power grid comprising a plurality of wires and vias that electrically connect to power pins and ground pins of components in the integrated circuit, the method comprising:
automatically generating, by a computer, commands for creating hardware descriptions of the wires and vias of the power grid based on a high level description, wherein the high level description includes a core grid and one or more sub grids that refer to the core grid;
receiving a specification for incrementally repairing a specific portion of the power grid; and
automatically re-generating commands for creating hardware descriptions of the wires and vias of only the specific portion of the power grid; and
providing the automatically generated and re-generated commands to a power grid router for creating shapes corresponding to the wires and vias of the power grid for use in physically implementing the integrated circuit,
wherein the automatically generated and re-generated commands are provided in a language that can be executed by the power grid router, and
wherein the high level description further includes a generic net name, and
wherein automatically generating includes mapping the generic net name to a specific power net for a sub-chip in the integrated circuit, and
wherein one or both of the core grid and the sub grid comprises a layer object having one or more stripe objects, and
wherein certain of the one or more stripe objects are specified as corresponding to the generic net name.

15. A system for implementing a power grid for a portion of an integrated circuit, the power grid comprising a plurality of wires and vias that electrically connect to power pins and ground pins of components in the integrated circuit, the system comprising:
a storage that stores hardware descriptions of components in the portion of the integrated circuit; and
a power grid compiler that is adapted to automatically generate commands for creating hardware descriptions of the wires and vias of the power grid based on a high level description of the power grid and the stored hardware descriptions of the components in the portion of the integrated circuit, the high level description including a core grid and one or more sub grids that refer to the core grid, wherein the power grid compiler is further adapted to provide the automatically generated commands to a power grid router for creating shapes corresponding to the wires and vias of the power grid for use in physically implementing the integrated circuit, and wherein the automatically generated commands are provided in a language that can be executed by the power grid router, and
wherein the high level description further includes a generic net name, and
wherein automatically generating includes mapping the generic net name to a specific power net for a sub-chip in the integrated circuit, and wherein one or both of the core grid and the sub grid comprises a layer object having one or more stripe objects, and wherein certain of the one or more stripe objects are specified as corresponding to the generic net name.

16. The system of claim 15, wherein the power grid compiler includes:
- a description module that is adapted to receive the high level description of the power grid from a designer of the integrated circuit; and
- a generation module that is adapted to automatically generate the commands for creating the hardware descriptions of the wires and vias of the power grid.

17. The system of claim 16, wherein the language comprises an assembly-like language for a specific tool.

18. The system of claim 15, further comprising a user interface for allowing a designer to create the high level description using a specified programming language.

* * * * *